(12) United States Patent
Lin

(10) Patent No.: US 12,187,372 B2
(45) Date of Patent: Jan. 7, 2025

(54) TOTAL HEIGHT ADJUSTABLE SEATPOST

(71) Applicant: J.D COMPONENTS CO., LTD., Chang Hua Hsien (TW)

(72) Inventor: Yu-An Lin, Chang Hua Hsien (TW)

(73) Assignee: J.D COMPONENTS CO., LTD., Chang Hua Hsien (TW)

( * ) Notice: Subject to any disclaimer, the term of this patent is extended or adjusted under 35 U.S.C. 154(b) by 190 days.

(21) Appl. No.: 18/150,891

(22) Filed: Jan. 6, 2023

(65) Prior Publication Data
US 2023/0211844 A1 Jul. 6, 2023

(30) Foreign Application Priority Data
Jan. 6, 2022 (TW) .................................. 111200187

(51) Int. Cl.
*B62J 1/08* (2006.01)
(52) U.S. Cl.
CPC ............ *B62J 1/08* (2013.01); *B62J 2001/085* (2013.01)
(58) Field of Classification Search
CPC ........................................................ B62J 1/08
See application file for complete search history.

(56) References Cited

U.S. PATENT DOCUMENTS

2022/0041236 A1* 2/2022 Lin ............................ B62J 1/08
2022/0055704 A1* 2/2022 Lin ............................ B62J 1/08

FOREIGN PATENT DOCUMENTS

CN 209617331 U * 11/2019
TW M613821 U 7/2021

* cited by examiner

*Primary Examiner* — Anthony D Barfield
(74) *Attorney, Agent, or Firm* — MUNCY, GEISSLER, OLDS & LOWE, P.C.

(57) ABSTRACT

A liftable seatpost includes an outer tube, an inner tube, and a bushing. A protrusion is provided at the outer surface of the inner tube. The bushing is disposed between the inner and outer tubes and includes an upper sleeve and a lower sleeve. The upper sleeve has an upper baffle ring with a first engaging portion. The lower sleeve has a lower baffle ring with a second engaging portion engaged with the first engaging portion of the upper sleeve. The edges of the upper and lower sleeves are abutted against each other, and the outer surface of the upper baffle ring is flushed with the outer surface of the lower baffle ring. Thus, the position corresponding to the bushing will not protrude too much and affect the appearance, and the stress transmitted from the protrusion of the inner tube to the upper sleeve can be effectively distributed.

18 Claims, 8 Drawing Sheets

TOTAL HEIGHT ADJUSTABLE SEATPOST

BACKGROUND OF THE INVENTION

1. Field of the Invention

The present invention relates to a bicycle seatpost and more particularly, to a total height adjustable seatpost.

2. Description of the Related Art

The height of the bicycle saddle will affect comfort and safety of riding. The current structure is equipped with an adjustable seatpost that can be operated to adjust the height of the saddle according to the rider's body shape, the rider's habits and the riding environment, such that the adjustable seatpost allows the rider to ride in the correct posture, thereby improving riding comfort and safety.

However, the inner tube of the adjustable seatpost can be lowered to achieve the effect of saving storage space. After the inner tube is lowered, the height of the inner tube needs to be re-adjusted if the rider would like to use it on the next ride. The rider may spend a lot of time looking for a suitable height of the saddle. This will cause inconvenience and trouble to the rider.

Taiwan Patent No. M613821 describes a liftable seatpost of a bicycle. As shown in FIGS. 3 and 4 of the aforesaid prior art, the bushing 50 includes an upper sleeve 60 and a lower sleeve 70. The bottom end of the upper sleeve 60 has an insertion slot 64, and the top end of the lower sleeve 70 has an insertion portion 72. The upper sleeve 60 is sleeved on the lower sleeve 70 in a way that the insertion slot 64 of the upper sleeve 60 is inserted into the insertion portion 72 of the lower sleeve 70. However, the outer surface of the upper sleeve 60 protrudes out of the outer surface of the lower sleeve 70. This cause that the structural volume of the liftable seatpost 10 at the position corresponding to the bushing 50 is relatively large, such that the visual appearance of the entire liftable seatpost 10 is less simple and neat, resulting in that product appearance of the liftable seatpost 10 is slightly inferior. On the other hand, in the process of adjusting the overall height of the liftable seatpost 10, the protrusion 32 of the inner tube 30 is abutted against one of the limiting grooves 78 of the lower sleeve 70. When the protrusion 32 is abutted against one of the limiting grooves 32, the stress is transmitted from the insertion portion 72 of the lower sleeve 70 to the insertion grove 64 of the upper sleeve 60 so as to be concentrated between the insertion portion 72 and the insertion slot 64. Under long-term use, there may be wear between the upper and lower sleeves 60, 70, which shortens the service life of the entire bushing 50.

SUMMARY OF THE INVENTION

It is a primary objective of the present invention to provide a liftable seatpost, which has a better appearance design and reduces wear between upper and lower sleeves.

To attain the above objective, the total height adjustable seatpost of the present invention comprises an outer tube, an inner tube, and a bushing. The inner tube is movably disposed upwards and downwards in the outer tube. The top end of the inner tube is located outside the outer tube, and the bottom end of the inner tube is received in the outer tube. The outer surface of the bottom end of the inner tube has a protrusion. The bushing is disposed between the inner tube and the outer tube and has an upper sleeve and a lower sleeve. The upper sleeve is rotatably disposed to the top end of the outer tube, and the bottom end of the upper sleeve has an upper baffle ring provided with a first engaging portion at a bottom end thereof. The lower sleeve is received in the outer tube and disposed to the bottom end of the upper sleeve. The bottom end of the lower sleeve has a lower baffle ring provided with a second engaging portion at the top end thereof engaged with the first engaging portion of the upper baffle ring, so that the upper sleeve and the lower sleeve are moved synchronously. The top edge of the lower baffle ring of the lower sleeve is abutted against the bottom edge of the upper baffle ring of the upper sleeve. The lower sleeve has a limiting portion at the bottom end thereof abutted against the protrusion of the inner tube. In addition, the outer surface of the upper baffle ring of the upper sleeve is flushed with the outer surface of the lower baffle ring of the lower sleeve.

It can be understood from the above illustration that since the outer surface of the upper baffle ring of the upper sleeve is flushed with the outer surface of the lower baffle ring of the lower sleeve, i.e., the outer surface of the upper baffle ring does not protrude out of the outer surface of the lower baffle ring, the structural volume of the liftable seatpost at the position corresponding to the bushing can be designed smaller without protruding too much from the outer surface of the outer tube, such that the overall appearance is simpler, neater and has a better appearance. On the other hand, since the top edge of the lower baffle ring of the lower sleeve is abutted against the bottom edge of the upper baffle ring of the upper sleeve, when the protrusion of the inner tube is abutted against the limiting portion of the lower sleeve, the stress generated from the protrusion can be effectively distributed through the full abutment between the top edge of the lower baffle ring and the bottom edge of the upper baffle ring, such that wear between the upper and lower sleeves can be reduced.

In one of the aspects, at least one of the first and second engaging portions is a concave hole or bump, i.e., the first engaging portion is a concave hole and the second engaging portion is a bump, or the first engaging portion is a bump and the second engaging portion is a concave hole. In some case, the lower sleeve can be made of flexible material so as to allow the second engaging portion to be slightly elastically deformed for engaging with the first engaging portion conveniently.

In another aspect, the first engaging portion can be designed to have a small diameter section and a large diameter section located above the small diameter section and integrally connected with the small diameter section. In this way, the lower sleeve is not easy to detach from the upper sleeve.

In another aspect, the hardness of the upper sleeve can be designed to be greater than the hardness of the lower sleeve. For example, the upper sleeve is made of metal and the lower sleeve is made of plastic. In this way, the upper sleeve can be used to bear the stress applied by the protrusion of the inner tube.

In another aspect, the inner surface of the upper baffle ring of the upper sleeve is flushed with the inner surface of the lower baffle ring of the lower baffle ring. In this way, the upward and downward movement of the inner tube can be smoother.

In another aspect, the upper sleeve further includes an annular main body disposed above the upper baffle ring and connected with the upper baffle ring. A backing ring is disposed in the annular main body and located between the upper sleeve and the inner tube for reducing friction between the upper sleeve and the inner tube.

In another aspect, the outer tube further includes a plurality of positioning slots arranged equiangularly at the top end of the outer tube. The upper sleeve further has an indicating flange disposed in one of the positioning slots. In this way, the rider can easily know the preset overall height of the bushing.

Other advantages and features of the present invention will be fully understood by reference to the following specification in conjunction with the accompanying drawings, in which like reference signs denote like components of structure.

DETAILED DESCRIPTION OF THE INVENTION

The technical content and features of the present invention will be described in detail by the following embodiment in coordination with the figures. The directional terms mentioned in the content of the specification, such as 'upper', 'lower', 'in', 'out', 'top', and 'bottom', are just for illustrative description on the basis of normal usage direction, not intended to limit the claimed scope.

Figure 1:
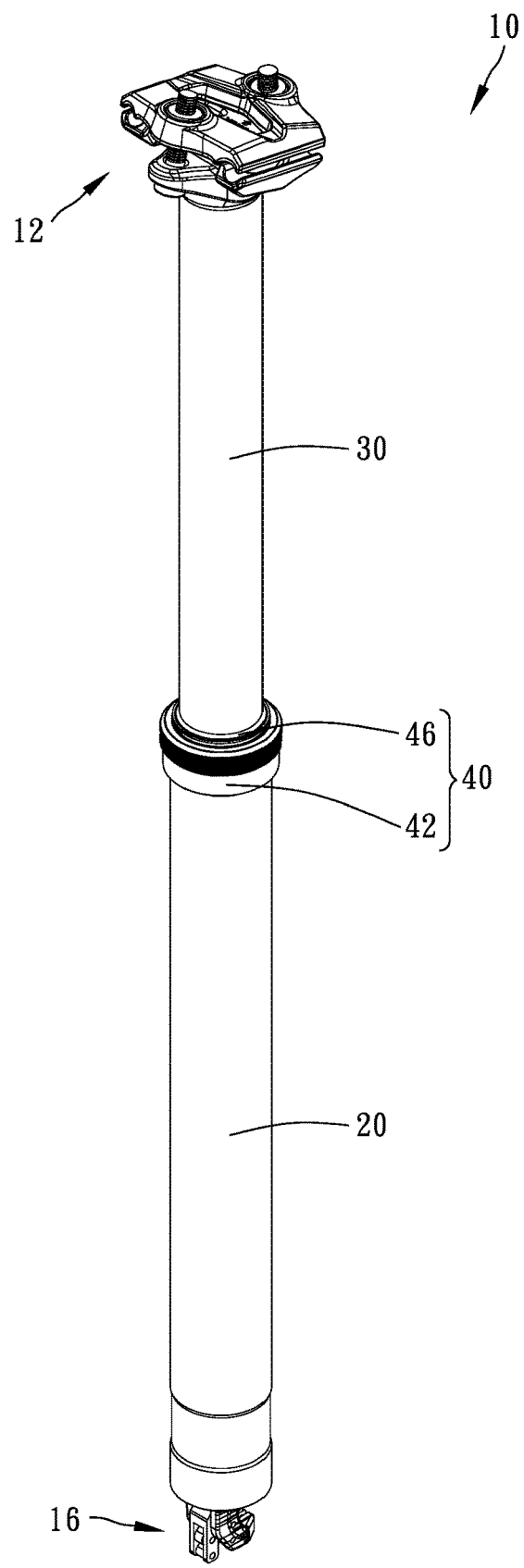
FIG. 1 is a perspective view of a liftable seatpost of the present invention.
Figure 2:
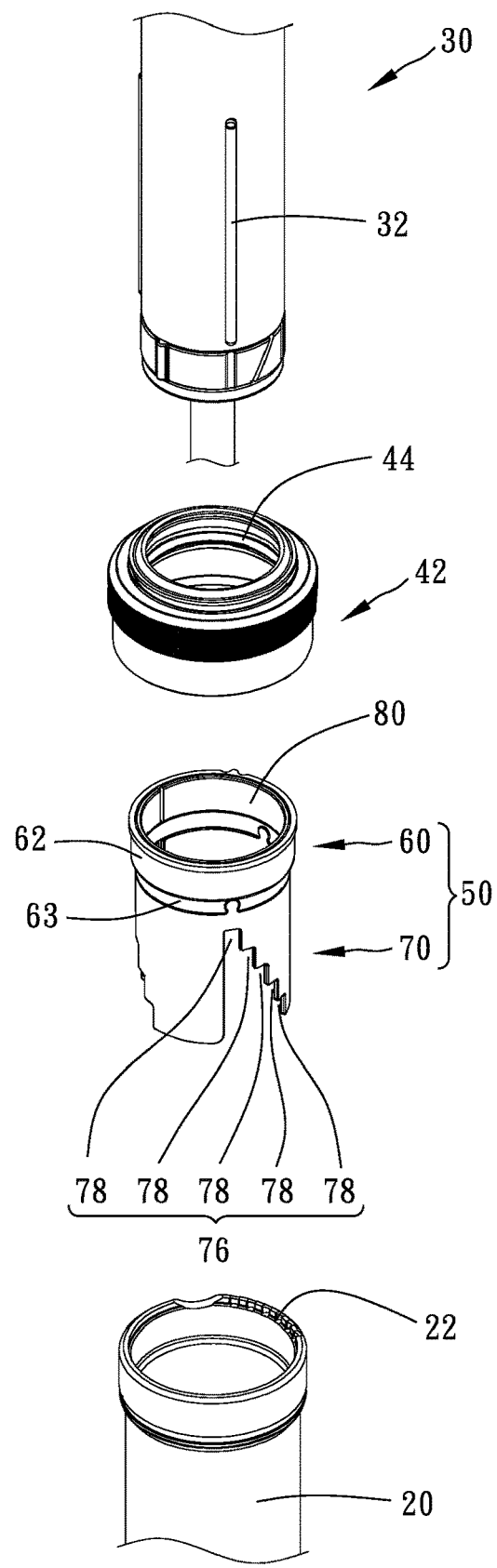
FIG. 2 is a partially exploded perspective view of the liftable seatpost of the present invention.

Referring to FIGS. 1 to 2, the liftable seatpost 10 of the present invention comprises an outer tube 20, an inner tube 30, a sealing component 40, and a bushing 50.

Figure 4:
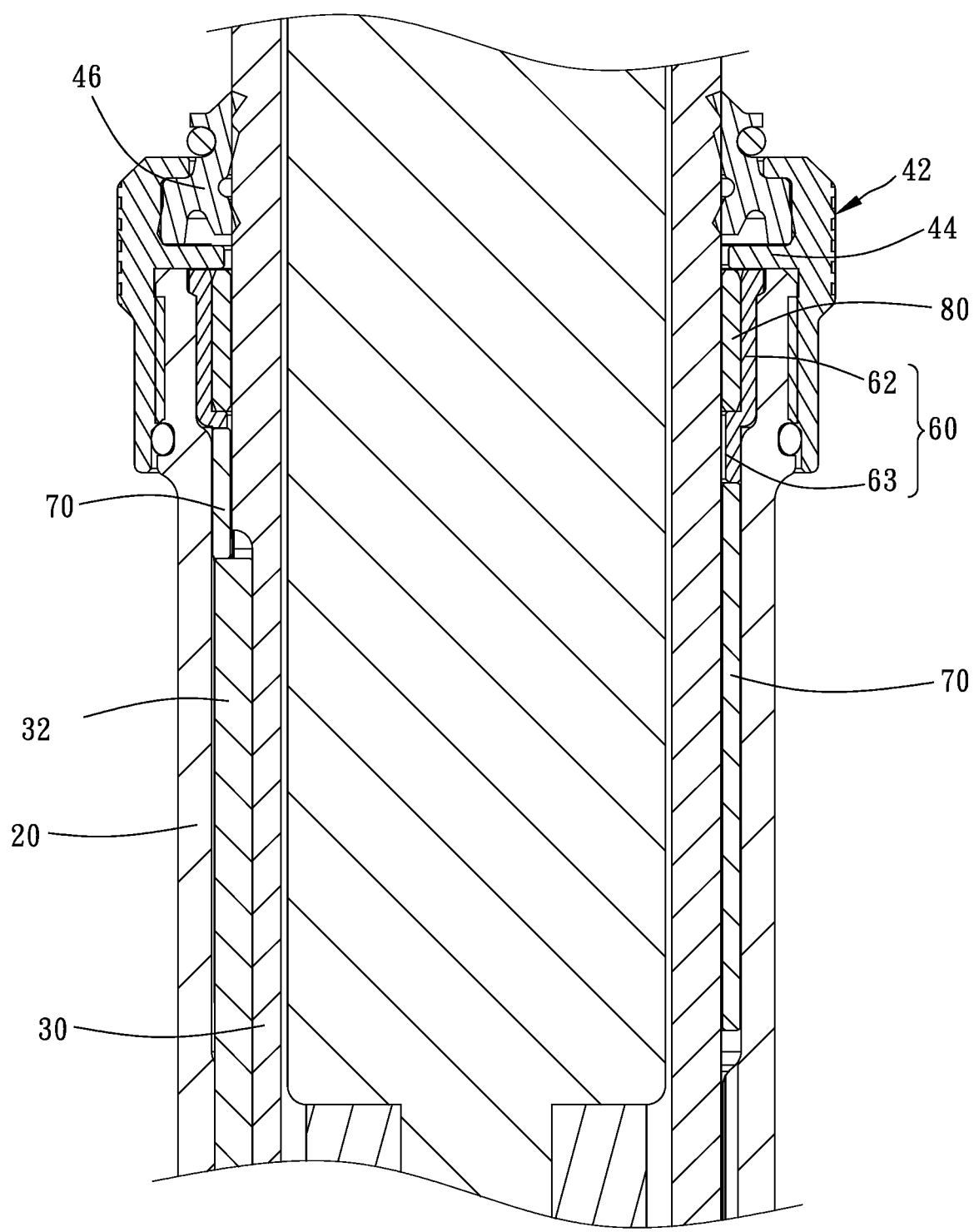
FIG. 4 is a partially enlarged sectional view of the liftable seatpost of the present invention.
Figure 6:
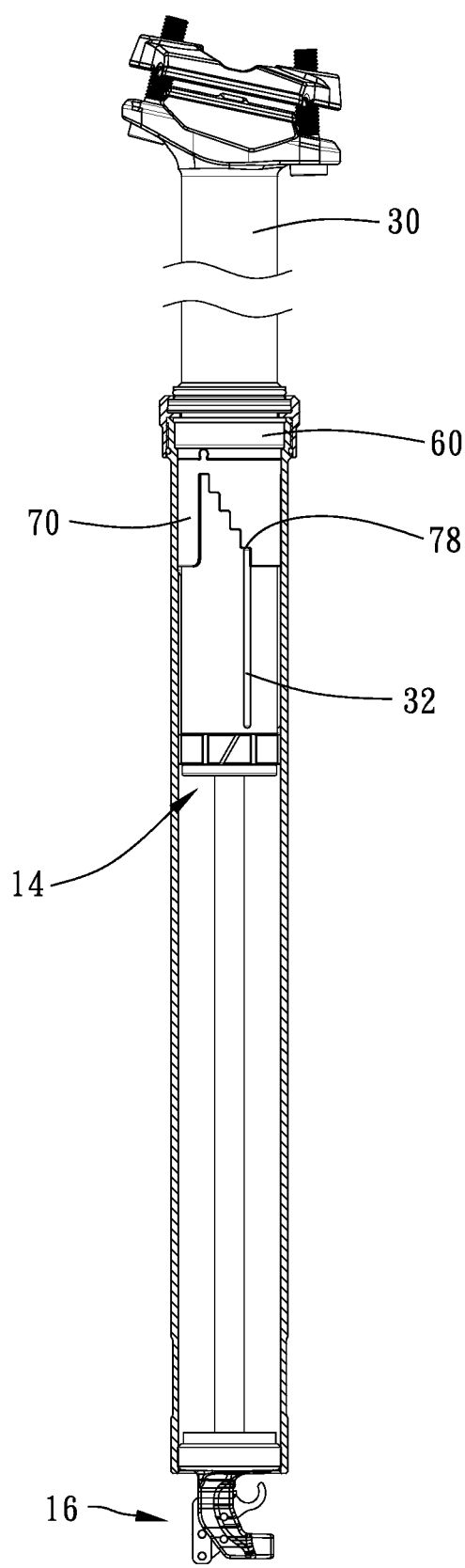

The top end of the inner tube 30 is located outside the outer tube 20 and equipped with a clamping seat 12 for mounting a saddle (not shown) The bottom end of the inner tube 30 is penetrated into the outer tube 20 through the top end of the outer tube 20. In addition, the outer surface of the bottom end of the inner tube 30 has three straight protrusions 32 (actually, at least one is sufficient, as shown in FIGS. 2, 4, and 6). The three protrusions 32 are arranged in an equally-spaced manner relative to the axis of the inner tube 30.

Figure 5:
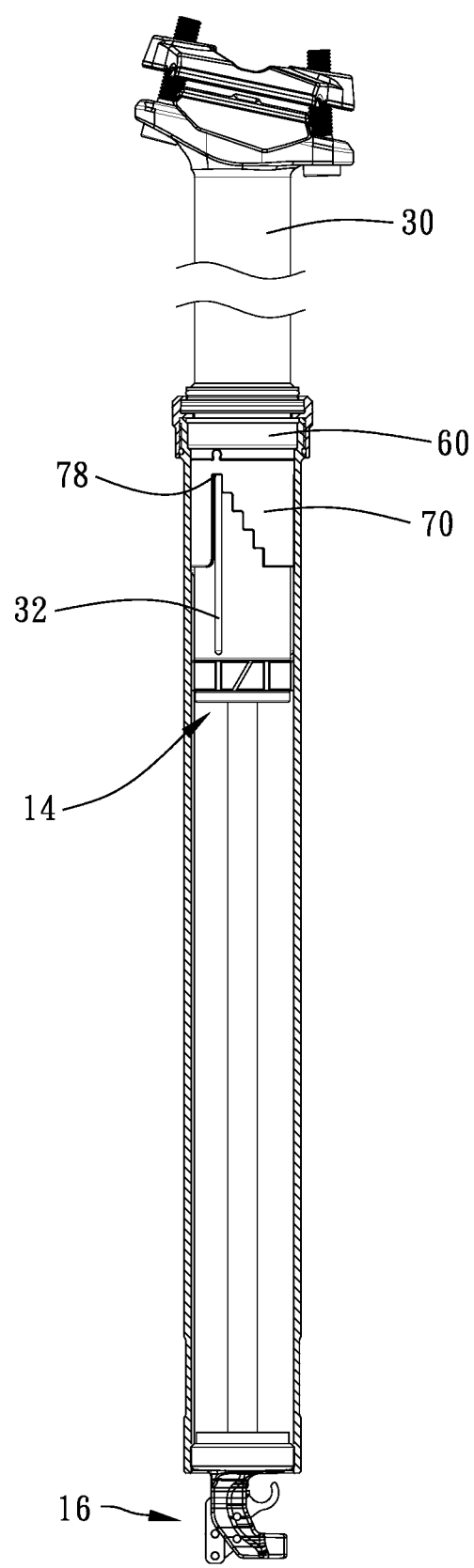
FIGS. 5 and 6 are partially sectional views of the liftable seatpost of the present invention, showing that the topmost and bottommost limiting slots of the bushing are abutted against the protrusion of the inner tube, respectively.

As shown in FIGS. 5 and 6, a pneumatic cylinder 14 is disposed in the outer tube 20 and the inner tube 30, and a trigger 16 is provided at the bottom of the outer tube 20. When the trigger 16 is driven by a controller (not shown) to turn on the pneumatic cylinder 14, the inner tube 30 can be lifted or lowered relative to the outer tube 20. If the top end of the inner tube 30 does not bear the weight of the rider, the inner tube 30 will be lifted relative to the outer tube 20, but if the top end of the inner tube 30 bears the weight of the rider, the inner tube 30 will be lowered relative to the outer tube 20.

As shown in FIGS. 2 and 4, the sealing element 40 includes a cap 42 and a sealing member 46. The cap 42 is screwed to the top end of the outer tube 20. The sealing member 46 is sleeved on the inner tube 30 and pressed by the cap 42 to force against the outer surface of the inner tube 30, thereby filling a gap between the outer tube 20 and the inner tube 30. In addition, the inner surface of the cap 42 has a shoulder portion 44 located below the sealing member 46.

Figure 3:
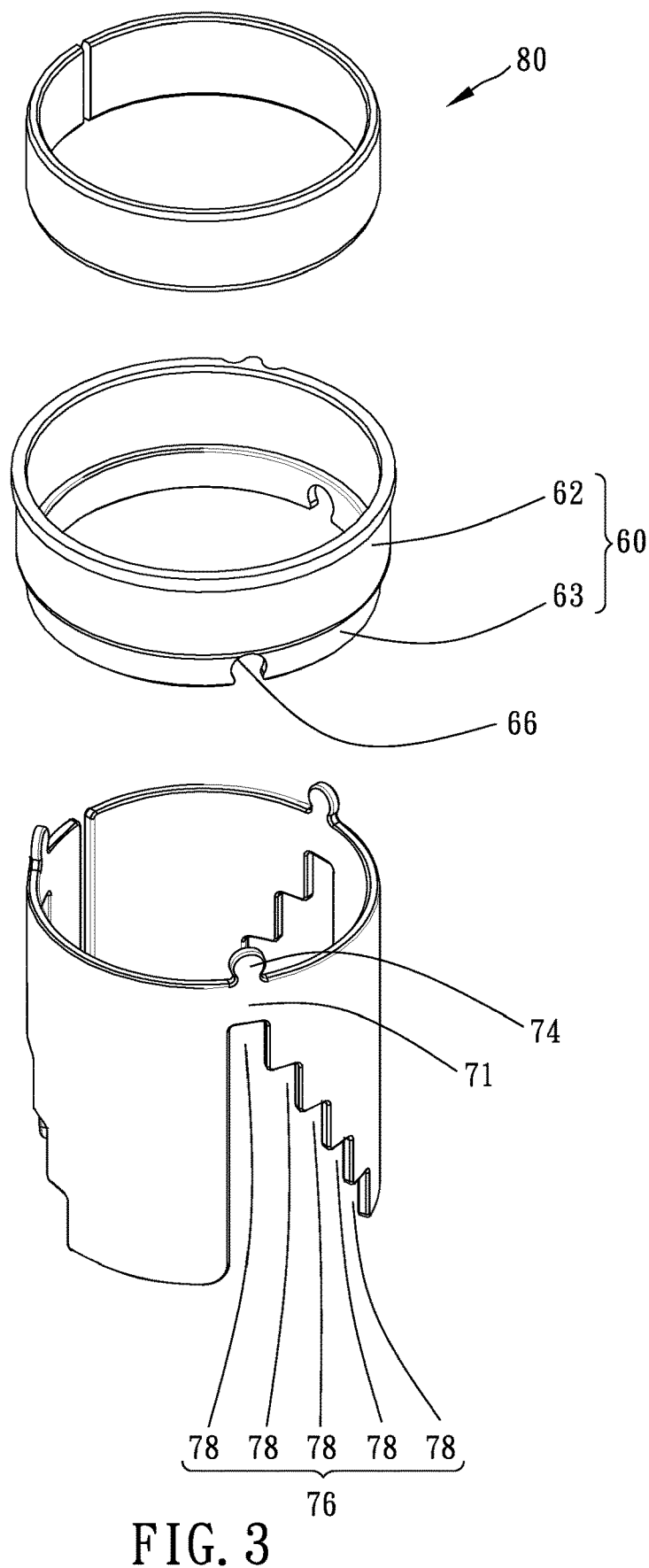
FIG. 3 is an exploded perspective view of a bushing and a backing ring provided by the liftable seatpost of the present invention.
Figure 7:
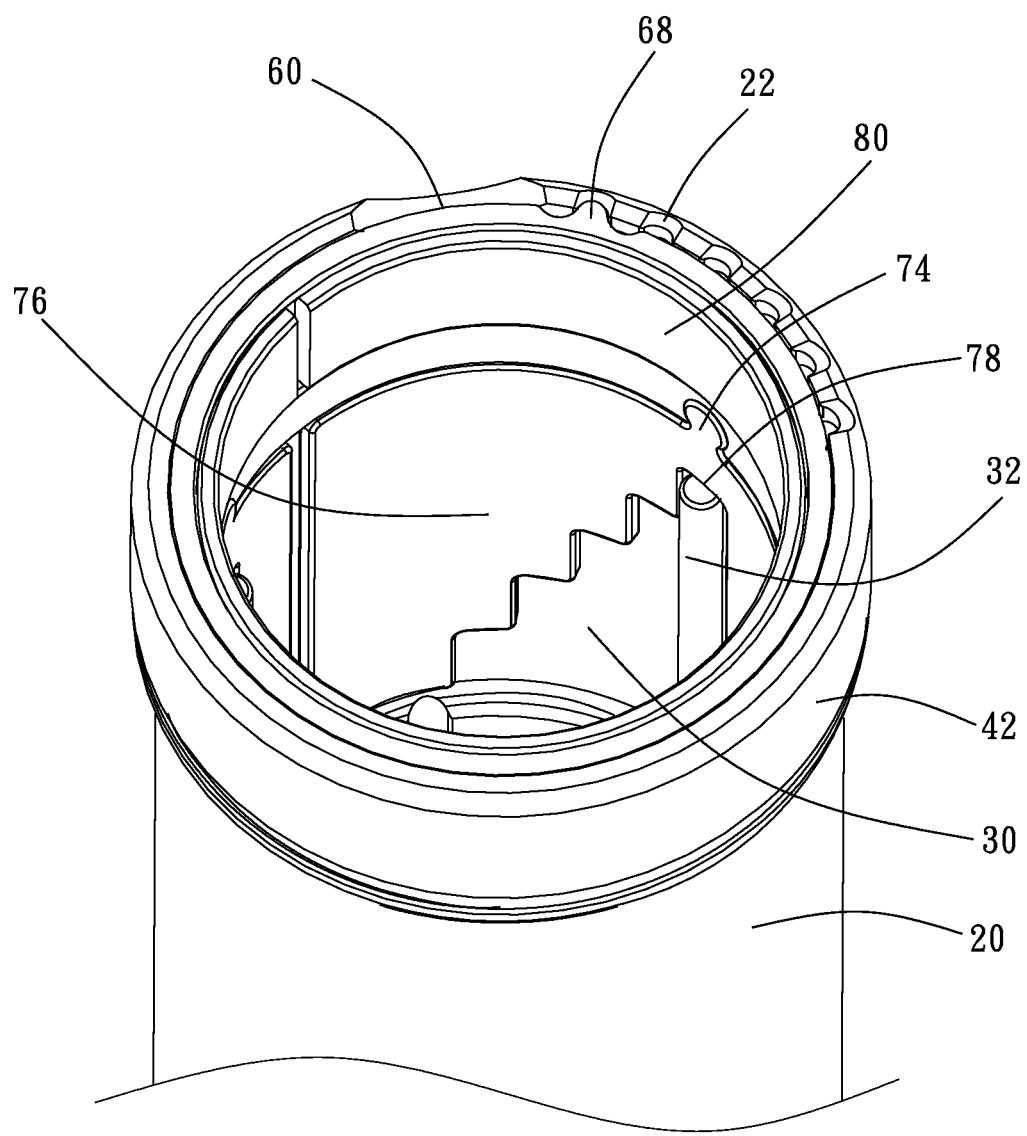
FIG. 7 is a perspective view of the liftable seatpost of the present invention partially omitting some components, showing that the indicating flange of the upper sleeve is disposed in one of the positioning slots.
Figure 8:
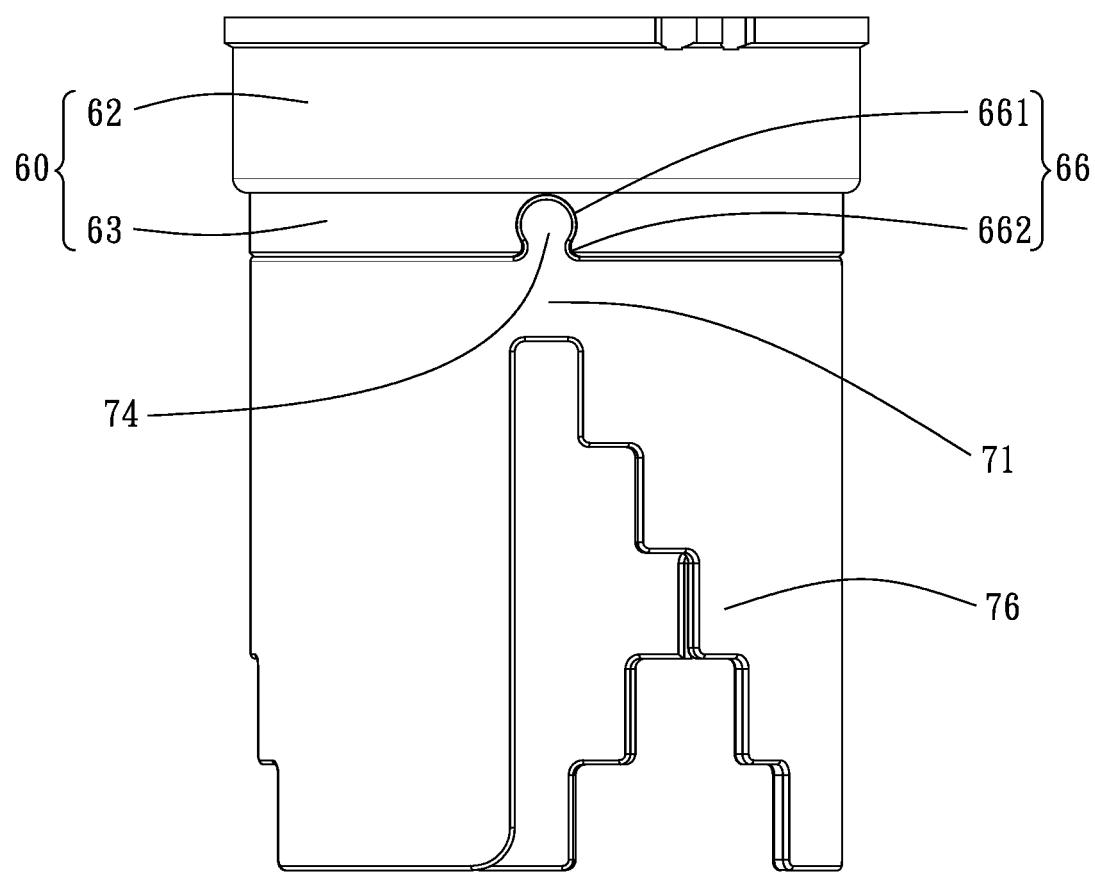
FIG. 8 is a lateral view of the bushing provided by the liftable seatpost of the present invention.

As shown in FIGS. 2 to 4, 7, and 8, the bushing 50 is disposed between the outer tube 20 and the inner tube 30, and includes an upper sleeve 60 and a lower sleeve 70. In this embodiment, the upper and lower sleeves 60, 70 are assembled together in a detachable manner. The upper sleeve 60 is rotatably disposed at the top end of the outer tube 20, as shown in FIGS. 3 and 8. The upper sleeve 60 is made of metal so as to have a higher hardness. The upper sleeve 60 includes an annular main body 62 and an upper baffle ring 63. The annular main body 62 is disposed above the upper baffle ring 63 and connected integrally with the upper baffle ring 63. The upper baffle ring 63 is located at the bottom end of the upper sleeve 60, and the bottom end of the upper baffle ring 63 has three first engaging portions 66 (actually, at least one is sufficient) arranged equiangularly. Each of the first engaging portions 66 is a concave hole. As shown in FIG. 8, the first engaging portion 66 has a small diameter section 662 and a large diameter section 661 located above the small diameter section 662 and integrally connected with the small diameter section 662. The large diameter section 661 is slightly round, and the small diameter section 662 extends from the bottom edge of the large diameter section 661 and decreases inwards.

As shown in FIGS. 3, 7, and 8, the lower sleeve 70 is received in the outer tube 20 and made of flexible material (such as plastic), such that the lower sleeve 70 can be slightly elastically deformed by an external force, and therefore the hardness of the upper sleeve 60 is greater than the hardness of the lower sleeve 70. The lower sleeve 70 includes a lower baffle ring 71 located at the top end of the lower sleeve 70, and a limiting portion 76 located at the bottom end of the lower sleeve 70. The top end of the lower baffle ring 71 has three second engaging portions 74 (actually, at least one is sufficient) arranged equiangularly. Each of the second engaging portions 74 is a bump. The position of the second engaging portion 74 corresponds to the position of the first engaging portion 66 in a one-to-one manner, and the configuration of the second engaging portion 74 and the configuration of the first engaging portion 66 are complementary. Since the second engaging portion 74 is made of flexible material, the second engaging portion 74 can be slightly elastically deformed to be engaged with the first engaging portion 66, so that the upper sleeve 66 and the lower sleeve 70 can be moved synchronously. In addition, the top edge of the lower baffle ring 71 of the lower sleeve 70 is almost completely abutted against the bottom edge of the upper baffle ring 63 of the upper sleeve 60. Further, the bottom end of the lower sleeve 70 has three limiting portions 76 (actually, at least one is sufficient) arranged in an equally-spaced manner around the axis of the outer tube 20 and located above the protrusions 32 of the inner tube 30. Each of the limiting portions 76 is formed by five limiting slots 78 arranged in a stepped manner along the axial direction of the outer tube 20. One of the limiting slots 78 of the lower sleeve 70 is abutted against one of the protrusions 32 of the inner tube 30 (see FIGS. 5 and 6), i.e., the bushing 50 is abutted against the protrusions 32 of the inner tube 30 through the limiting portions 76 of the lower sleeve 70. In addition, the outer surface of the upper baffle ring 63 of the upper sleeve 60 is flushed with the outer surface of the lower baffle ring 71 of the lower sleeve 70, and the inner surface of the upper baffle ring 63 of the upper sleeve 60 is flushed with the inner surface of the lower baffle ring 71 of the lower sleeve 70.

It can be seen from the above that since the outer surface of the upper baffle ring 63 of the upper sleeve 60 is flushed with the outer surface of the lower baffle ring 71 of the lower sleeve 70, i.e., the outer surface of the upper baffle ring 63 does not protrude radially out of the outer surface of the lower baffle ring 71, the structural volume of the liftable seatpost 10 at the position corresponding to the bushing 50 can be designed smaller without protruding too much from the outer surface of the outer tube 20, such that the overall appearance is more concise and has a better appearance. On the other hand, since the top edge of the lower baffle ring 71 of the lower sleeve 70 is abutted against the bottom edge of the upper baffle ring 63 of the upper sleeve 60, when the inner tube 30 is driven by the pneumatic cylinder 14 to a desired or a predetermined height, and the protrusion 32 of the inner tube 30 is abutted against one of the limiting slots 78 of the limiting portion 76 of the lower sleeve 70, the stress generated from the protrusion 32 can be effectively distributed through the full abutment between the top edge of the lower baffle ring 71 and the bottom edge of the upper baffle ring 63, such that wear between the upper and lower sleeved 60, 70 can be reduced to increase the service life of the liftable seatpost 10.

As shown in FIGS. 3, 4, and 7, in order to increase lubricating effect, a liftable seatpost 10 further includes a backing ring 80. The backing ring 80 is a self-lubricating bearing in the embodiment. The backing ring 80 is disposed in the annular main body 62 and located between the upper sleeve 60 and the inner tube 30 for reducing friction between the bushing 50 and the inner tube 30.

In addition, as shown in FIGS. 2 and 7, the top end of the outer tube further 20 includes a plurality of positioning slots 22 (by taking six curved slots as an example, but not limited to this) arranged equiangularly relative to the axis of the outer tube 20. The upper sleeve 60 has an indicating flange 68. As such, when the bushing 50 is rotated, the indicating flange 68 of the upper sleeve 60 corresponds to one of the positioning slots 22, such that the rider can grasp the rotation angle of the bushing 50 to improve the adjustment accuracy.

What is claimed is:

1. A liftable seatpost comprising:
an outer tube;
an inner tube movably disposed upwards and downwards in the outer tube, and having a top end thereof located outside the outer tube and a bottom end thereof received in the outer tube, an outer surface of the inner tube having a protrusion; and
a bushing disposed between the inner tube and the outer tube, and having an upper sleeve rotatably disposed at a top end of the outer tube and a lower sleeve received in the outer tube and disposed at a bottom end of the upper sleeve, a bottom end of the upper sleeve having an upper baffle ring provided with a first engaging portion at a bottom end thereof, a top end of the lower sleeve having a lower baffle ring provided with a second engaging portion at a top end thereof engaged with the first engaging portion of the upper baffle ring, so that the upper sleeve and the lower sleeve are moved synchronously, a top edge of the lower baffle ring of the lower sleeve being abutted against a bottom edge of the upper baffle ring of the upper sleeve, a bottom end of the lower sleeve having a limiting portion abutted against the protrusion of the inner tube;
wherein an outer surface of the upper baffle ring of the upper sleeve is flushed with an outer surface of the lower baffle ring of the lower sleeve.

2. The liftable seatpost as claimed in claim 1, wherein at least one of the first and second engaging portions is a concave hole or bump.

3. The liftable seatpost as claimed in claim 2, wherein the lower sleeve is made of flexible material.

4. The liftable seatpost as claimed in claim 3, wherein the first engaging portion has a small diameter section and a large diameter section located above the small diameter section and integrally connected with the small diameter section.

5. The liftable seatpost as claimed in claim 1, wherein a hardness of the upper sleeve is greater than a hardness of the lower sleeve.

6. The liftable seatpost as claimed in claim 5, wherein the upper sleeve is made of metal.

7. The liftable seatpost as claimed in claim 1, wherein an inner surface of the upper baffle ring of the upper sleeve is flushed with an inner surface of the lower baffle ring of the lower baffle ring.

8. The liftable seatpost as claimed in claim 1, wherein the upper sleeve further includes an annular main body disposed above the upper baffle ring and connected with the upper baffle ring; a backing ring is disposed in the annular main body and located between the upper sleeve and the inner tube.

9. The liftable seatpost as claimed in claim 1, wherein the outer tube further includes a plurality of positioning slots arranged equiangularly at a top end of the outer tube; the upper sleeve further has an indicating flange disposed in one of the positioning slots.

10. The liftable seatpost as claimed in claim 1, wherein the limiting portion has a plurality of limiting slots arranged in a stepped manner along an axial direction of the inner tube; one of the limiting slots of the lower sleeve is abutted against the protrusion of the inner tube.

11. The liftable seatpost as claimed in claim 2, wherein the limiting portion has a plurality of limiting slots arranged in a stepped manner along an axial direction of the inner tube; one of the limiting slots of the lower sleeve is abutted against the protrusion of the inner tube.

12. The liftable seatpost as claimed in claim 3, wherein the limiting portion has a plurality of limiting slots arranged in a stepped manner along an axial direction of the inner tube; one of the limiting slots of the lower sleeve is abutted against the protrusion of the inner tube.

13. The liftable seatpost as claimed in claim 4, wherein the limiting portion has a plurality of limiting slots arranged in a stepped manner along an axial direction of the inner tube; one of the limiting slots of the lower sleeve is abutted against the protrusion of the inner tube.

14. The liftable seatpost as claimed in claim 5, wherein the limiting portion has a plurality of limiting slots arranged in a stepped manner along an axial direction of the inner tube; one of the limiting slots of the lower sleeve is abutted against the protrusion of the inner tube.

15. The liftable seatpost as claimed in claim 6, wherein the limiting portion has a plurality of limiting slots arranged in a stepped manner along an axial direction of the inner tube; one of the limiting slots of the lower sleeve is abutted against the protrusion of the inner tube.

16. The liftable seatpost as claimed in claim 7, wherein the limiting portion has a plurality of limiting slots arranged in a stepped manner along an axial direction of the inner tube; one of the limiting slots of the lower sleeve is abutted against the protrusion of the inner tube.

17. The liftable seatpost as claimed in claim 8, wherein the limiting portion has a plurality of limiting slots arranged in a stepped manner along an axial direction of the inner tube; one of the limiting slots of the lower sleeve is abutted against the protrusion of the inner tube.

18. The liftable seatpost as claimed in claim 9, wherein the limiting portion has a plurality of limiting slots arranged in a stepped manner along an axial direction of the inner tube; one of the limiting slots of the lower sleeve is abutted against the protrusion of the inner tube.

\* \* \* \* \*